June 20, 1944.  G. F. BAUMANN  2,351,801
BOTTLE TRANSFER FOR PASTEURIZERS
Filed Dec. 30, 1943  2 Sheets-Sheet 1
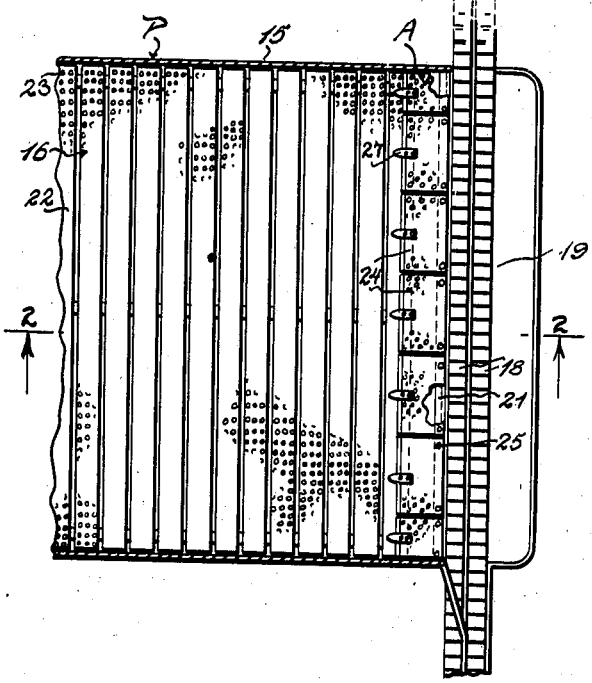
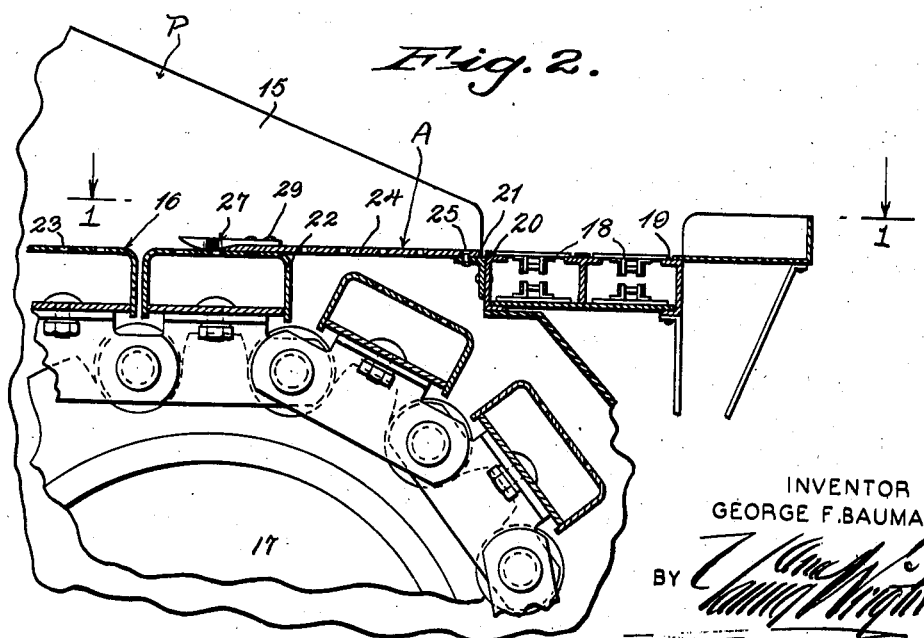
INVENTOR
GEORGE F. BAUMANN
ATTORNEYS

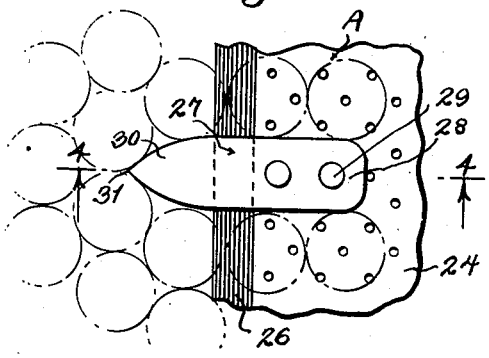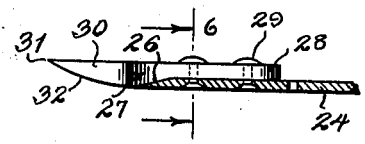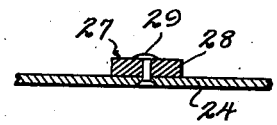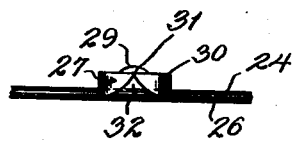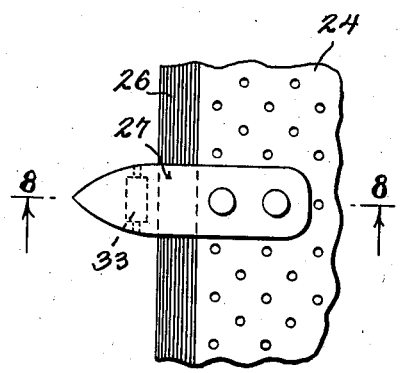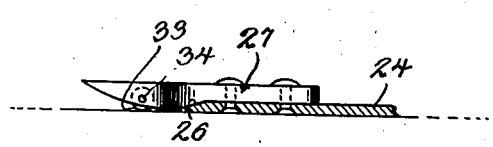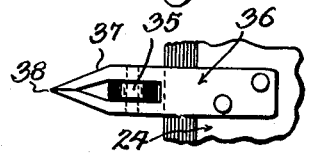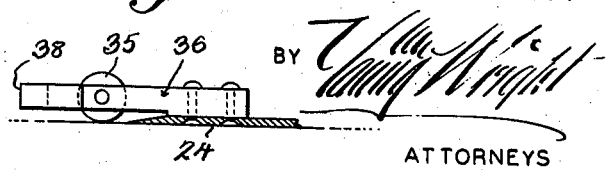

Patented June 20, 1944

2,351,801

UNITED STATES PATENT OFFICE 2,351,801

BOTTLE TRANSFER FOR PASTEURIZERS

George F. Baumann, West Allis, Wis., assignor to Pabst Brewing Company, Milwaukee, Wis.

Application December 30, 1943, Serial No. 516,197

5 Claims. (Cl. 198—28)

This invention appertains to pasteurizing machines and more particularly to a novel means for facilitating the transfer of liquid containers from a longitudinal conveyor to a transverse unloading conveyor.

Beer pasteurizing machines differ in the type of longitudinal conveyor used and in the transfer mechanism employed for the longitudinal conveyor. In one type of machine, the flights of the longitudinal conveyor are slotted or grooved and fingers extend into the grooves or slots at the unloading end thereof and facilitate the travel of the receptacles from the longitudinal conveyor to the transverse conveyor. In another type of machine, the flights of the conveyor are not slotted or grooved and the flights have smooth outer faces. With this type of conveyor much difficulty is experienced in properly transferring the receptacles or containers from the longitudinal conveyor to the transverse conveyor.

It is, therefore, one of the primary objects of my invention to provide a means in the pasteurizing machines, having a longitudinal conveyor provided with smooth faced flights, for closing the gap between the longitudinal conveyor and the transverse conveyor and for effectively engaging the smooth face of the flights at the unloading end of the conveyor for effectively permitting the rapid and proper transfer of containers from the longitudinal conveyor to the transverse conveyor.

Another salient object of my invention is the provision of a plurality of individual stripper plates carried by the frame of the pasteurizing machine and extending from directly in front of the transverse conveyor and over a flight of the longitudinal conveyor, the stripper plates being movable relative to one another and to the flights of the longitudinal conveyor, whereby the plates will conform to any irregularities occurring in the flights of the longitudinal conveyor.

A further important object of my invention is the provision of a novel guide shoe carried by each stripper plate for facilitating the riding of the plates over the flights of the longitudinal conveyor during the travel of such conveyor, whereby the plates can be maintained in close contact with the flights to permit the easy riding of the bottles on the plates without tipping over.

A still further object of my invention is the provision of novel means for forming the shoes whereby not only will the shoes facilitate the uninterrupted travel of the longitudinal conveyor past the plates, but whereby the shoes will effectively engage the bottles to divide and distribute the bottles over the stripper plates.

With these and other objects in view, the invention consists in the novel construction, arrangement and the formation of parts as will be hereinafter more specifically described, claimed and illustrated in the accompanying drawings, in which drawings:

Figure 1 is a fragmentary, longitudinal, sectional view through the unload end of a pasteurizing machine showing my novel bottle transfer mechanism incorporated therewith, the section being taken on the line 1—1 of Figure 2 looking in the direction of the arrows.

Figure 2 is a fragmentary, vertical, sectional view through the unload end of a pasteurizing machine with my novel transfer mechanism incorporated therewith, the section being taken on the line 2—2 of Figure 1 looking in the direction of the arrows, the view being on a larger scale than Figure 1.

Figure 3 is an enlarged fragmentary, top plan view of one of my novel transfer plates, the view being of somewhat a diagrammatic nature and illustrating how the shoe functions to distribute the bottles from the longitudinal conveyor over the transverse conveyor.

Figure 4 is a fragmentary, detailed, sectional view through one of the transfer plates taken on the line 4—4 of Figure 3 looking in the direction of the arrows.

Figure 5 is a fragmentary, front elevational view of one of the plates showing the leading edge of the plate.

Figure 6 is a detail sectional view through one transfer plate taken on the lines 6—6 of Figure 4.

Figure 7 is a fragmentary top plan view similar to Figure 3 but showing a slightly modified form of shoe.

Figure 8 is a sectional view through the modified form taken on the line 8—8 of Figure 7 looking in the direction of the arrows.

Figure 9 is a fragmentary top plan view showing a still further form of shoe.

Figure 10 is a sectional view through one transfer plate illustrating the form of shoe shown in Figure 9.

Referring to the drawings in detail, wherein similar reference characters designate corresponding parts throughout the several views, the letter P generally indicates a beer pasteurizing machine and A my novel transfer attachment therefor.

As the beer pasteurizing machine P is of the type now commonly found in the open market and extensively used in breweries, the same will not be described in detail, but the same includes a housing or casing 15, through which travels a longitudinal conveyor 16 for carrying the receptacles containing the beer through the housing, where the receptacles and their contents go through the pasteurizing process. At the unload end of the machine, the conveyor 16 is trained over sprocket wheels 17 and directly in front of the longitudinal conveyor is the transversely extending unload conveyor 18, which carries the receptacles to the desired point, such as a labeling machine. The transverse conveyor 18 is supported by suitable frame 19 and the innermost rail 20 of the frame can have attached thereto an angle bar 21. This angle bar 21 extends across the machine, as can be readily seen by referring to Figure 1.

The longitudinal conveyor 16 includes a plurality of flights 22 and the body of each flight is preferably formed from metal of a U shape in cross section. The bodies are perforated as 23 to facilitate the drainage of water therethrough, but it is to be noted that the outer faces of the flights are substantially smooth and flat.

To facilitate the uninterrupted movement of the receptacles, such as bottles, from the longitudinal conveyor 16 to the transverse conveyor 18, my novel transfer attachment A is employed.

This attachment A includes a plurality of transfer stripper plates 24 and these plates are preferably formed from flat relatively thin sheets of metal. The plates extend in a single transverse row across the machine and the outer edges thereof are fastened to the angle bar 21 in any desired manner, such as by the use of rivets 25. These stripper plates 24 project inwardly from the angle bar over the conveyor and rest upon the upper face of one of the horizontal flights of the upper run of the conveyor 16. The leading edge of each plate is beveled or sharpened at 26 to facilitate the movement of receptacles onto the plates from the conveyor 16 without tipping over. The plates are somewhat of a resilient nature and are normally held in close contact with the conveyor 16. However, the leading edges of the plates are free to give so that the plates will conform to any undulations which might occur in the plates.

In order to facilitate the movement of the conveyor 16 under the stripper plates without danger of the stripper plates catching in the flights, each plate is provided with a novel guide shoe 27. The guide shoes 27 project forwardly beyond the leading edges of the plates and each shoe includes an attaching shank 28. These shanks are riveted, as at 29, or otherwise secured to the plates. The forwardly projecting bodies 30 of the shoes 27 have their opposite edges beveled to form a tapered leading end 31. The lower face of the bodies of the shoes are also beveled upwardly as 32 to form a riding guide surface for engaging the flights. Thus, it will be seen that the guide surface 32 engages the flights ahead of the plates and consequently this surface acts to raise and lower the plates as irregularities occur in the surface of the flights.

The bottles or other receptacles travel with the conveyor 16 in close formation, see Figure 3, and consequently as the bottles approach the plates, the tapered sides of the shoes and the leading points 31 act to divide the bottles and distribute the same over the stripper plates.

In use of my invention, during the travel of the conveyor 16 the bottles will be pushed onto the plates 24 and this movement is facilitated by the knife edge 26 and the shoes 27. As the conveyor continues to travel the bottles will be forced over the plates and onto the conveyor 18 and as the outer edges of the plates are in close proximity to the transverse conveyor, movement of the bottles from the plates onto the conveyor 18 will be easily accomplished.

To facilitate the travel of the conveyor 16 past the stripper plates without undue wear on the shoes 27, the shoes can be provided with anti-friction rollers 33, see Figures 7 and 8. As illustrated in these figures, the lower face of the shoes can be recessed to receive the rollers and pins 34 can be utilized for supporting the rollers. The rollers extend slightly below the lower curved faces of the shoes and roll on the outer faces of the flights.

In Figures 9 and 10 I have shown another way of mounting anti-friction rollers 35 on shoes 36. In this form, the shoes can be formed from bar stock and the forward end of each bar is bifurcated to receive the anti-friction roller and to form arms 37. The outer ends of the arms are bent inwardly into contact with one another to provide the desired tapered sides and leading point 38.

From the foregoing description, it can be seen that I have provided an exceptionally simple and rugged device for facilitating the transfer of receptacles from a longitudinal conveyor to a transverse conveyor, which is of such a character that the same can readily be incorporated with existing pasteurizing machines now being used in breweries and other plants.

Changes in detail may be made without departing from the spirit or the scope of my invention, but what I claim as new is:

1. In a machine of the character described, a frame, a conveyor mounted in said frame including a plurality of flights having a substantially smooth outer face, a stripper plate secured at its outer edge to the frame and projecting over the conveyor and having a sharpened front leading edge resting flat on the smooth surface of the conveyor, and a guide shoe projecting forwardly beyond said leading edge and having a tapered leading guide point.

2. In a machine of the character described, a frame, a conveyor mounted in said frame including a plurality of flights having a substantially smooth outer face, a stripper plate secured at its outer edge to the frame and projecting over the conveyor and having a sharpened front leading edge resting flat on the smooth surface of the conveyor, and a guide shoe projecting forwardly beyond said leading edge having a tapered leading guide point, said shoe being located intermediate the side edges of the plate.

3. In a machine of the character described, a frame, a conveyor mounted in said frame including a plurality of flights having smooth outer faces, a plurality of stripper plates disposed at the takeoff end of said conveyor, and arranged in a row extending transversely of said conveyor, means for securing the outer edge of each plate to the frame, said plates projecting inwardly over the conveyor and each having a front beveled edge resting flat on a smooth outer face of the conveyor, and a forwardly projecting guide shoe for each plate having tapered sides and a leading point, the shoes engaging the conveyor in front of the plates.

4. In a machine of the character described, a frame, a conveyor mounted in said frame having a substantially smooth outer face, a plurality of stripper plates at the unload end of the conveyor arranged in a row transversely of the conveyor, means independently securing each plate at its outer end to the frame, said plates projecting over the conveyor and having a beveled edge resting flat on the conveyor, and a guide shoe carried by each plate projecting forwardly therefrom having tapered sides defining a leading point, the lower surface of each shoe being curved upwardly to provide a guide face and engaging the conveyor in advance of its plate.

5. In a machine of the character described, a frame, a conveyor mounted in said frame, having a smooth, flat conveyor surface, a plurality of stripper plates arranged at the unload end of the conveyor in a row extending transversely of the conveyor, each plate having a sharpened leading edge resting flat against the smooth surface of the conveyor, and a guide shoe for each plate projecting forwardly from the plate in advance of said sharpened edge, each shoe having inclined sides defining a leading point, and an anti-friction member carried by each shoe engaging the conveyor in advance of the plates.

GEORGE F. BAUMANN.